Aug. 29, 1933.  E. H. KNIGHT  1,924,322
GEAR REDUCTION CONSTANT SPEED UNIT WITH UNIVERSAL MOTORS
Filed Feb. 7, 1931
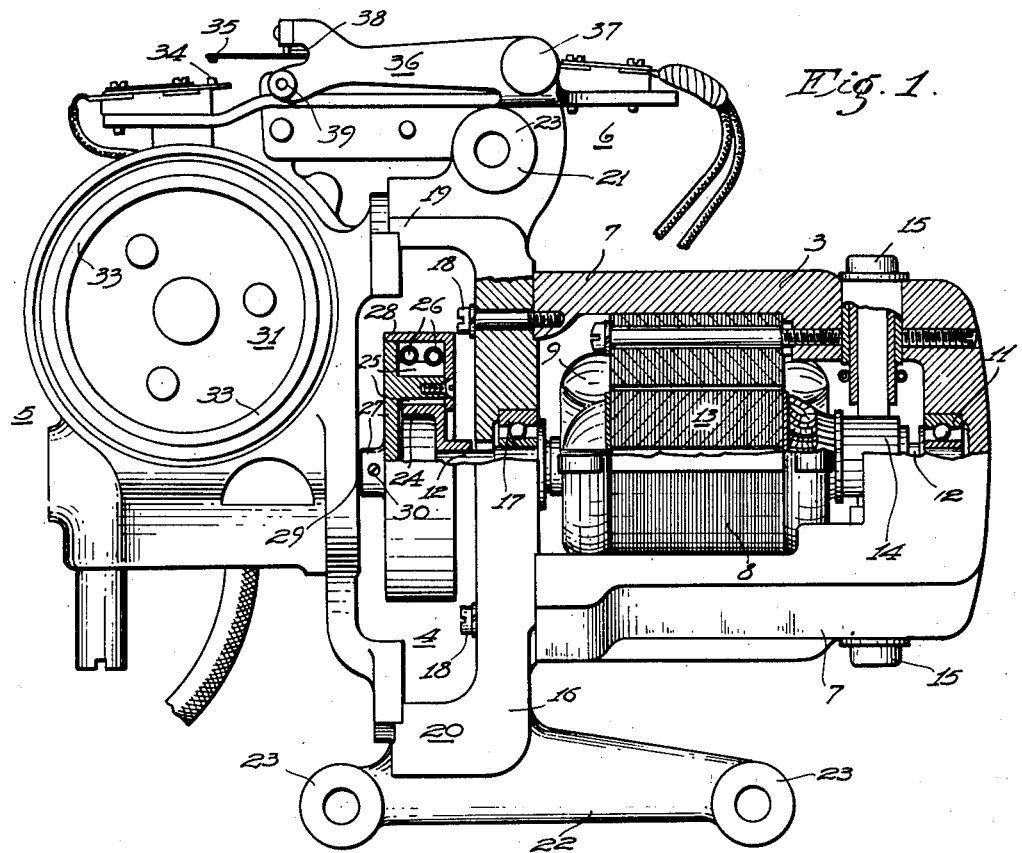
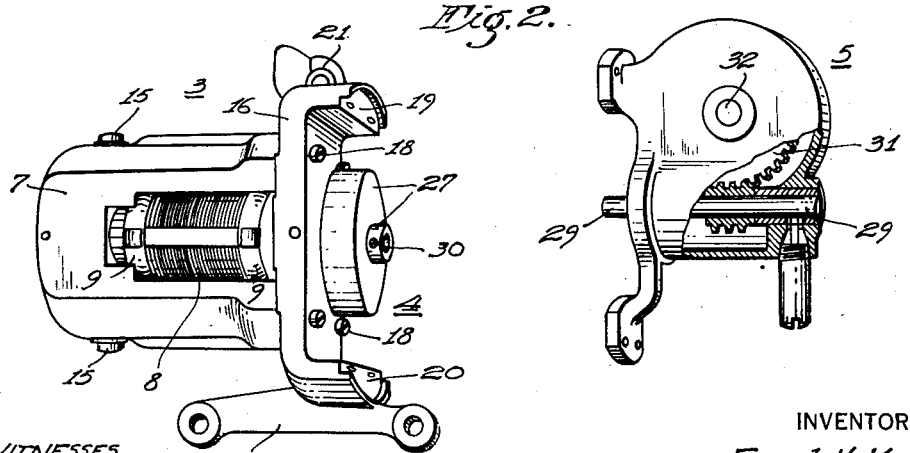
INVENTOR
Ernest H. Knight.
BY
ATTORNEY
WITNESSES.

Patented Aug. 29, 1933

1,924,322

UNITED STATES PATENT OFFICE 1,924,322

GEAR-REDUCTION CONSTANT-SPEED UNIT WITH UNIVERSAL MOTORS

Ernest H. Knight, Springfield, Mass., assignor to Westinghouse Electric & Manufacturing Company, a Corporation of Pennsylvania Application February 7, 1931. Serial No. 514,184

6 Claims. (Cl. 172—36)

My invention is an improvement in a constant-speed reduction-gear unit, utilizing a variable-speed motor, as described and claimed in an application of L. C. Packer, Serial No. 514,191, filed February 7, 1931.

More specifically it is a specific embodiment of such a drive unit especially adapted for a motor-driven cash register or the like, such as is described and claimed in an application of Ralph Ehrenfeld and myself, Serial No. 514,186, filed February 7, 1931.

The principal object of my invention is to produce a desirable unit for application to cash registers and to similar applications requiring to be driven at a constant speed and variable loads.

More specifically my invention aims to provide a detachably united motor-clutch-gear unit, either with, or without, a start-and-stop switch, comprising a universal motor, a constant-speed centrifugal clutch, and a worm gear or other reduction gearing; or to provide the motor-clutch unit for this said combination.

A still further object of my invention is to make possible the use of a high-speed motor, with a consequent reduction in the necessary size of the motor, in combination with a centrifugal clutch and a reduction gear, in order to secure the quick-starting qualities of a high-speed, universal, series, commutator motor, while securing a constant-speed drive without requiring a motor which maintains a constant speed under all load conditions.

With the foregoing and other objects in view, my invention consists in the structures and combinations hereinafter described and claimed, and illustrated in the accompanying drawing, wherein Figure 1 is a perspective view of the back side of a unit in accordance with my invention, showing the side which is normally disposed against a cash register or other driven member, parts being shown in section, and Fig. 2 is an exploded perspective view of the motor-clutch element and the reduction-gear element, separated from each other, as seen from the front side of the apparatus, parts being shown in section.

As shown in the drawing, my invention comprises a variable-speed motor 3, which is preferably a high-speed, series, commutator motor of the type which is known as "universal", that is, a motor which will operate either on alternating current or direct current. Associated with the motor, is a constant-speed centrifugal clutch 4 which drives a reduction-gear unit 5, and disposed over the motor unit is a start-and-stop switch 6, as described in the aforesaid Ehrenfeld and Knight application.

The particular motor shown in the drawing has an open-ended frame 7, the sides of which have been cut away to save space. Within the frame is disposed a laminated magnetic field structure 8 carrying series field windings 9. The closed end of the frame carries a bearing 11 for the end of the motor shaft 12 on which is mounted the armature 13 and commutator cylinder 14. Two brushes 15, suitably mounted in the frame 7, bear upon the commutator cylinder 14.

The open end of the motor frame 7 is closed by means of an end housing or bracket 16 which is provided with a bearing 17 through which the motor shaft projects. The end housing is detachably connected to the motor frame 7 by means of screws 18.

The end housing 16 is provided with upper and lower outward extensions 19 and 20 which are spaced over and under the motor shaft 12, and which may, or may not, be connected to form a complete tubular extension. In the form shown in the drawing, the tubular formation is not completed. At any rate the two extensions 19 and 20 may be regarded as a part of a tubular extension at one end of the motor.

The end housing 16 also carries upper and lower supporting feet or brackets 21 and 22, which are disposed for mounting the motor sidewise with respect to the mounting surface which is indicated by the numeral 23.

The centrifugal clutch 4 is mounted on the projecting end of the motor shaft 12 within the extensions 19 and 20. It comprises a drum 24 which is secured to the end of the motor shaft, and which is surrounded by a plurality of frictional weight members 25, which are pressed against the drum by one or more garter springs 26, said weight members being carried by a driven member in the form of a hub 27, which also carries a guard 28 extending over the garter springs 26 so as to enclose the clutch-parts.

The centrifugal clutch 4 just described is preferably that which is described and claimed in an application of C. R. Libby, Serial No. 501,014, filed December 9, 1930. The motor-clutch unit itself is an improvement of the more broadly claimed unit which constitutes the subject matter of an application of L. C. Packer, Serial No. 514,120, filed February 7, 1931.

The motor and clutch, as just described, constitute a separate unit which may be sold as a complete unit adapted to be applied to a cash register or other unit to be driven, or it may be associated with the reduction-gear unit 5, which comprises a suitably journalled worm shaft 29 which is adapted to form a coaxial extension of the motor shaft 12, except that it is driven at a constant speed less than the normal speed of the motor shaft, by being detachably connected as by means of a set screw 30, to the constant-speed driven-hub 27 of the clutch unit. The gear unit also comprises a large gear wheel 31 having a shaft 32 which is journalled to rotate at right angles to the worm shaft and above the same. The rear face of the large gear wheel 31 is provided with a rearwardly extending hollow tubular extension 33 which is adapted to be the outer clutch element of a separate declutchable driving-clutch unit (not shown) on the cash register, as described in the above mentioned Ehrenfeld and Knight application.

Disposed on top of the motor unit, and preferably mounted as an integral part of the end housing 16, is the start-and-stop switch element 6 comprising a stationary bottom contact member 34 and a spring-mounted top contact member 35. The latter is preferably engaged by a switch contact lever 36 which is pivoted at 37, which is provided with an insulating arm 38 bearing upon the top of the spring-contact member 34, and which is also provided with a roller 39 which is adapted to be pressed down by the switch-actuating mechanism (not shown) of the cash register, or any other means. The switch 6 is connected in series with the motor for starting and stopping the same at the beginning and end of each operation.

While I have described my invention in a preferred form of embodiment, it will be obvious that I am not altogether limited to the structural details described and illustrated. I desire, therefore, that the appended claims be accorded the broadest construction consistent with their language and the prior art.

I claim as my invention:

1. In combination, a variable-speed electric motor characterized by a frame having an extension at one end; a constant-speed centrifugal clutch secured to the motor shaft and disposed within said extension; and a reduction-gear unit driven at a constant speed by said clutch and characterized by a frame which is detachably secured to said extension of the motor frame.

2. In combination, a variable-speed electric motor; a constant-speed centrifugal clutch secured to the motor shaft at one end of the motor; and a reduction-gear unit, driven at a constant speed by said clutch, and comprising a worm shaft coaxial with the motor shaft and detachably connected to the constant-speed driven member of said clutch, a worm wheel and worm-wheel shaft driven by said worm, and a gear casing detachably secured to the motor frame, said gear casing and motor frame at least partially enclosing said clutch.

3. In combination, a variable-speed electric motor; a constant-speed centrifugal clutch secured to the motor shaft at one end of the motor; and a reduction-gear unit, driven at a constant speed by said clutch, and comprising a gear casing detachably secured to the motor frame, said gear casing and motor frame at least partially enclosing said clutch.

4. In combination, a variable-speed electric motor; a constant-speed centrifugal clutch secured to the motor shaft at one end of the motor; a reduction-gear unit, driven at a constant speed by said clutch, and comprising a gear casing detachably secured to the motor frame, said gear casing and motor frame at least partially enclosing said clutch; and a start-and-stop switch for the motor mounted on the top of the gear casing and motor frame.

5. A motor-clutch unit comprising a variable-speed electric motor characterized by a frame having at least one open end; an end housing detachably secured to said open end, said end housing being characterized by a bearing for the motor shaft, upper and lower outward extensions spaced over and under the motor shaft extending through said bearing, and mounting brackets secured to said extensions for mounting the motor sidewise with respect to the mounting surface; and a centrifugal clutch characterized by a driving drum secured to said extending motor shaft, friction means engaging the periphery of said drum, spring means for forcing said friction means against said drum, and a driven hub attached to said friction means and carrying a protective guard extending over said spring means.

6. A motor-clutch unit comprising a variable-speed electric motor charaterized by a frame having at least one open end; an end housing detachably secured to said open end, said end housing being characterized by a bearing for the motor shaft, and upper and lower outward extensions spaced over and under the motor shaft extending through said bearing; and a centrifugal clutch characterized by a driving drum secured to said extending motor shaft, friction means engaging the periphery of said drum, spring means for forcing said friction means against said drum, and a driven hub driven by said friction means; and a reduction-gear unit driven at a constant speed by said clutch and characterized by a frame which is detachably secured to said extensions of the end housing of the motor.

ERNEST H. KNIGHT.